United States Patent
Lin et al.

(10) Patent No.: US 11,893,756 B2
(45) Date of Patent: Feb. 6, 2024

(54) DEPTH CAMERA DEVICE

(71) Applicant: GUANGDONG OPPO MOBILE TELECOMMUNICATIONS CORP., LTD., Guangdong (CN)

(72) Inventors: Yuan Lin, Palo Alto, CA (US); Chiuman Ho, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 408 days.

(21) Appl. No.: 17/244,645

(22) Filed: Apr. 29, 2021

(65) Prior Publication Data
US 2021/0248770 A1    Aug. 12, 2021

Related U.S. Application Data

(63) Continuation of application No. PCT/CN2019/105459, filed on Sep. 11, 2019.
(Continued)

(51) Int. Cl.
*G01B 11/22* (2006.01)
*G06T 7/50* (2017.01)
(Continued)

(52) U.S. Cl.
CPC .............. *G06T 7/593* (2017.01); *G01B 11/22* (2013.01); *G06T 7/50* (2017.01); *H04N 13/254* (2018.05);
(Continued)

(58) Field of Classification Search
None
See application file for complete search history.

(56) References Cited

U.S. PATENT DOCUMENTS 4,306,762 A    12/1981   Yamashita et al.
5,610,652 A    3/1997    Suzuki
(Continued)

FOREIGN PATENT DOCUMENTS

CN    103424979 A    12/2013
CN    104083145 A    10/2014
(Continued)

OTHER PUBLICATIONS

International search report International Application No. PCT/CN2019/105459 dated Dec. 5, 2019 (9 pages).
(Continued)

*Primary Examiner* — Joni Hsu
(74) *Attorney, Agent, or Firm* — Young Basile Hanlon & MacFarlane, P.C.

(57) ABSTRACT

Electronic device depth camera systems having a reduced number of outwardly-facing optical components are disclosed. Monocular depth camera systems, including basic depth camera systems as well as RGB-D camera systems, have exactly one window on a housing panel of the device through which light is transmittable out of and into the device housing. An optical emitter and detector(s) are located within the device housing. Binocular RGB-D camera systems have exactly two outwardly-facing optical components on the housing panel. One of the components, such as an optical emitter or an exit window, is associated with illumination light leaving the device, and the other optical component is an entrance window associated with transmitting detection light into the housing.

14 Claims, 9 Drawing Sheets

Related U.S. Application Data

(60) Provisional application No. 62/754,888, filed on Nov. 2, 2018.

(51) Int. Cl.
  *G06T 7/593* (2017.01)
  *H04N 13/257* (2018.01)
  *H04N 13/254* (2018.01)

(52) U.S. Cl.
  CPC . *H04N 13/257* (2018.05); *G06T 2207/10024* (2013.01); *G06T 2207/10028* (2013.01)

(56) References Cited

U.S. PATENT DOCUMENTS

| | | | | |
|---|---|---|---|---|
| 7,690,247 | B1* | 4/2010 | Lapota | G01C 13/00 73/61.51 |
| 2005/0285966 | A1 | 12/2005 | Bamji et al. | |
| 2012/0074227 | A1* | 3/2012 | Ferren | G06V 40/20 396/76 |
| 2014/0055565 | A1 | 2/2014 | You et al. | |
| 2017/0285936 | A1* | 10/2017 | Hirshberg | G09G 3/003 |
| 2018/0106936 | A1* | 4/2018 | Heshmat Dehkordi | G01S 17/894 |
| 2018/0191879 | A1 | 7/2018 | Evans, V | |

FOREIGN PATENT DOCUMENTS

| | | |
|---|---|---|
| JP | 2008145270 A | 6/2008 |
| JP | 2010066566 A | 3/2010 |

OTHER PUBLICATIONS

Chinese first Office Action with English Translation for CN Application 201980070909.5 dated Apr. 6, 2022. (10 pages).

* cited by examiner

DEPTH CAMERA DEVICE

CROSS-REFERENCE TO RELATED APPLICATION(S)

This application is a continuation-application of International (PCT) Patent Application No. PCT/CN2019/105459 filed on Sep. 11, 2019, which claims priority to U.S. Provisional application No. 62/754,888 filed on Nov. 2, 2018, the entire contents of both of which are hereby incorporated by reference.

TECHNICAL FIELD

The present disclosure is in the field of depth cameras capable of capturing depth information of a scene. Depth cameras are incorporated, for example, in electronic devices such as mobile phones (including so-called "smartphones"), tablets, laptops, and gaming modules.

BACKGROUND

Depth cameras can acquire a depth image containing depth information of a scene in a field of view of the depth camera. Several techniques are known for acquiring the depth image, such as time-of-flight (ToF) methods, static and dynamic structured light methods, and stereo camera vision methods. All known depth camera systems have at least two outwardly-facing optical components. For example, a ToF-based depth camera has an infra-red (IR) emitter and an IR camera (i.e. a photosensitive detector sensitive to wavelengths in the IR spectral range). FIG. 1 of the drawings illustrates a prior art depth camera system of this type. As another example, a depth camera based on dynamic structured light is composed of a projector and a photosensitive detector. The two optical components are typically installed on a front panel of the electronic device (i.e. a panel of the electronic device facing the scene to be captured), and therefore occupy space on the front panel. This is particularly a problem for smartphones where the front panel of the device is predominantly a display screen, as smartphone companies are trying to increase the screen-to-body ratio nowadays. The outwardly-facing optical components of the depth camera system occupy space on the front panel that could otherwise be used for the display screen.

It is known to combine a depth camera with a camera capable of acquiring a visible-spectrum color image of a scene in a field of view. Such enhanced depth camera systems may be referred to as "RGB-D" cameras (Red Green Blue-Depth). RGB-D camera systems have an RGB light detector and a depth camera system. The RGB detector acquires the color information of objects in the field of view, while the depth camera system acquires the depth information of objects in the field of view. As mentioned above, basic depth camera systems have two outwardly-facing optical components. Therefore, to provide an electronic device with an RGB-D camera system, no fewer than three outwardly-facing optical components need to be installed on the front panel of the device. FIG. 2 of the drawings illustrates a prior art RGB-D camera system of this type. The addition of an RGB detector on the front panel compounds the problem of a lack of space on the panel.

The known depth camera systems and RGB-D camera systems described above have other drawbacks. The depth image may include many shadows due to occlusion of an illuminating IR beam and a viewing angle difference between the IR emitter and the IR camera. Manufacturing includes more operations because at least two lenses or windows must be installed in the front panel. Making a waterproof device is more difficult because more liquid-sealed seams are needed between the panel material and the camera system components. In electronic devices such as smartphones that have a notch covering a portion of the display screen for accommodating camera components (see FIG. 3), the need for additional camera components increases the size of the notch, reduces the screen-to-body ratio, and makes the smartphone uglier in appearance. In known RGB-D camera systems, extra processing steps are required to properly align the depth images to the RGB images because the depth images and the RGB images are acquired from different viewing angles.

SUMMARY

According to a first aspect of the disclosure, there is provided a device. The device may include a housing, an optical emitter, a photosensitive first detector, an illumination optical path and a detection optical path. The housing may include a panel having a window through which light is transmittable out of and into the housing. The optical emitter may be within the housing. The optical emitter may emit light in a first spectral band. The photosensitive first detector may be within the housing. The first detector may be configured to detect light in the first spectral band and generate a first detection signal in response to the detected light in the first spectral band. Light emitted by the optical emitter may travel along the illumination optical path from the optical emitter to the window to exit the housing. Light in the first spectral band entering the housing through the window may travel along the detection optical path from the window to the first detector. The light in the first spectral band entering the housing through the window may include light in the first spectral band reflected from at least one object in a field of view outside the housing. A portion of the illumination optical path leading to the window coincides with a portion of the detection optical path leading from the window.

According to a second aspect of the disclosure, there is provided a device. The device may include a housing, an optical emitter, a photosensitive first detector, an illumination optical path, a detection optical path, a photosensitive second detector within the housing and a supplemental detection optical path. The housing may include a panel having a window through which light is transmittable out of and into the housing. The optical emitter may be within the housing. The optical emitter may emit light in a first spectral band. The photosensitive first detector may be within the housing. The first detector may be configured to detect light in the first spectral band and generate a first detection signal in response to the detected light in the first spectral band. Light emitted by the optical emitter may travel along the illumination optical path from the optical emitter to the window to exit the housing. Light in the first spectral band entering the housing through the window may travel along the detection optical path from the window to the first detector. The light in the first spectral band entering the housing through the window may include light in the first spectral band reflected from at least one object in a field of view outside the housing. The second detector may be configured to detect light in a second spectral band different from the first spectral band and generate a second detection signal in response to the detected light in the second spectral band. Light in the second spectral band entering the housing through the window may travel the supplemental detection optical path from the window to the second detector. The light in the second spectral band entering the housing through the window may include light in the second spectral band reflected from or emitted by the at least one object in the field of view. A portion of the illumination optical path leading to the window coincides with a portion of the detection optical path leading from the window.

According to a third aspect of the disclosure, there is provided a device. The device may include a housing, an optical emitter, a photosensitive first detector within the housing, a photosensitive second detector within the housing, a detection optical path and a supplemental detection optical path. The housing may include a panel having an entrance window through which light may be transmittable into the housing. The optical emitter may emit light in a first spectral band and may be arranged such that light emitted by the optical emitter propagates outside the housing. The first detector may be configured to detect light in the first spectral band and generate a first detection signal in response to the detected light in the first spectral band. The second detector may be configured to detect light in a second spectral band different from the first spectral band and generate a second detection signal in response to the detected light in the second spectral band. Light in the first spectral band entering the housing through the entrance window may travel along the detection optical path from the entrance window to the first detector. The light in the first spectral band entering the housing through the entrance window may include light in the first spectral band reflected from at least one object in a field of view outside the housing. Light in the second spectral band entering the housing through the entrance window may travel along the supplemental detection optical path from the entrance window to the second detector. The light in the second spectral band entering the housing through the entrance window may include light in the second spectral band reflected from or emitted by the least one object in the field of view. A portion of the detection optical path leading from the entrance window coincides with a portion of the supplemental detection optical path leading from the entrance window.

BRIEF DESCRIPTION OF DRAWINGS

The nature and mode of operation of the present disclosure will now be more fully described in the following detailed description of the disclosure taken with the accompanying drawing figures, in which.

DETAILED DESCRIPTION

Figure 1:
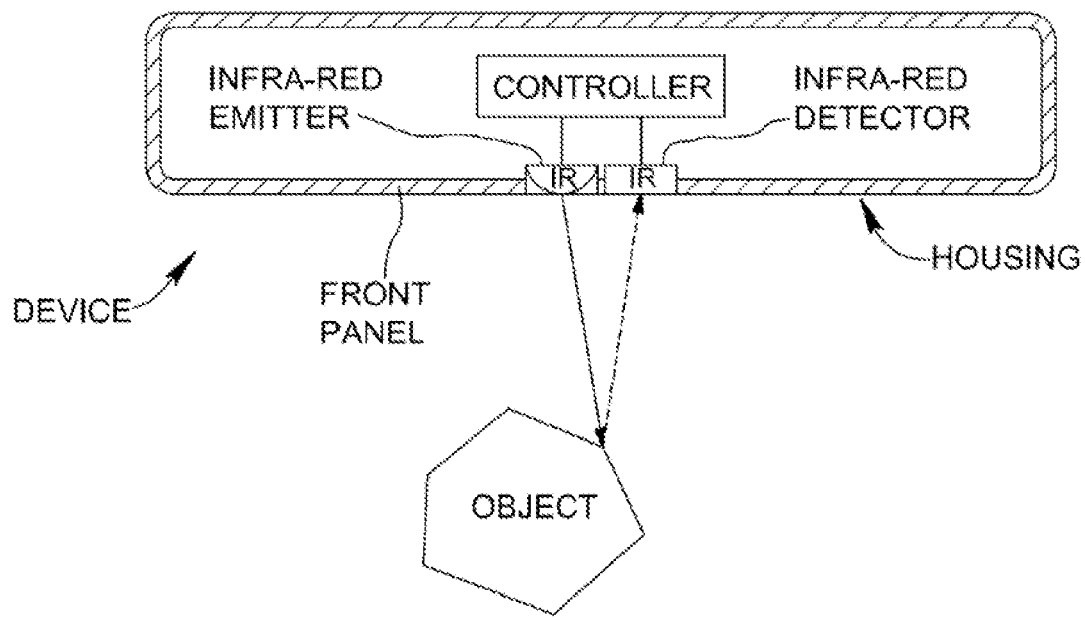
FIG. 1 is a schematic view of a device having a known depth camera system of the prior art.

The present specification describes various depth camera systems which may be incorporated into different types of electronic devices such as smartphones, tablets, laptops, and gaming modules. For example, depth camera systems may provide imaging capability for facial recognition applications, virtual and augmented reality applications, and other applications executed by electronic devices. The various depth camera systems described in this specification may be grouped into three general categories: monocular depth camera systems, monocular RGB-D camera systems, and binocular RGB-D camera systems. The first through fourth embodiments illustrated in FIGS. 4-7 relate to monocular depth camera systems. The fifth through eighth embodiments illustrated in FIGS. 8-11 relate to monocular RGB-D camera systems. The ninth through eleventh embodiments illustrated in FIGS. 12-14 relate to binocular RGB-D camera systems. It is a goal of the present disclosure to reduce the number of outwardly-facing optical components on a housing panel of the device.

In some embodiments, a device may include a housing, an optical emitter, a photosensitive first detector, an illumination optical path and a detection optical path. The housing may include a panel having a window through which light is transmittable out of and into the housing. The optical emitter may be within the housing. The optical emitter may emit light in a first spectral band. The photosensitive first detector may be within the housing. The first detector may be configured to detect light in the first spectral band and generate a first detection signal in response to the detected light in the first spectral band. Light emitted by the optical emitter may travel along the illumination optical path from the optical emitter to the window to exit the housing. Light in the first spectral band entering the housing through the window may travel along the detection optical path from the window to the first detector. The light in the first spectral band entering the housing through the window may include light in the first spectral band reflected from at least one object in a field of view outside the housing. A portion of the illumination optical path leading to the window coincides with a portion of the detection optical path leading from the window.

In some embodiments, the device may include a semi-transparent mirror within the housing. The semi-transparent mirror may be positioned in the illumination optical path and in the detection optical path.

In some embodiments, the semi-transparent mirror may transmit light along the illumination optical path and reflect light along the detection optical path.

In some embodiments, the device may include a mirror positioned in the detection optical path.

In some embodiments, the semi-transparent mirror may reflect light along the illumination optical path and transmit light along the detection optical path.

In some embodiments, the device may include a structured light component in the illumination optical path.

In some embodiments, the structured light component may be a diffractive optical element.

In some embodiments, the first spectral band may be within the infra-red region of the electromagnetic spectrum.

In some embodiments, the device may include a photo-sensitive second detector within the housing and a supplemental detection optical path. The second detector may be configured to detect light in a second spectral band different from the first spectral band and generate a second detection signal in response to the detected light in the second spectral band. Light in the second spectral band entering the housing through the window may travel the supplemental detection optical path from the window to the second detector. The light in the second spectral band entering the housing through the window may include light in the second spectral band reflected from or emitted by the at least one object in the field of view.

In some embodiments, the device may include a dichroic mirror positioned in the detection optical path and in the supplemental detection optical path. The dichroic mirror may separate the supplemental detection optical path from the detection optical path.

In some embodiments, the dichroic mirror may reflect light along the detection optical path and may transmit light along the supplemental detection optical path.

In some embodiments, the first spectral band may be within the infra-red region of the electromagnetic spectrum and the second spectral band may be within the visible region of the electromagnetic spectrum.

In some embodiments, the window may include a fisheye lens.

In some embodiments, the panel may be a front panel of the housing. The window may be a front window of the front panel, and the housing may further include a rear panel having a rear window opposite the front window. The device may further include: a rear illumination optical path and a rear detection optical path. Light emitted by the optical emitter may travel along a rear illumination optical path from the optical emitter to the rear window to exit the housing. Light in the first spectral band entering the housing through the rear window may travel along the rear detection optical path from the rear window to the first detector. The light in the first spectral band entering the housing through the rear window may include light in the first spectral band reflected from at least one object in a further field of view outside the housing. A portion of the rear illumination optical path leading to the rear window may coincide with a portion of the rear detection optical path leading from the rear window.

In some embodiments, the device may include a first semi-transparent mirror and a second semi-transparent mirror. The first and second semi-transparent mirrors being located within the housing. The first semi-transparent mirror may be positioned in the illumination optical path and in the rear detection optical path, and the second semi-transparent mirror may be positioned in the rear illumination optical path and in the detection optical path.

In some embodiments, the panel may be a front panel of the housing. The window may be a front window of the front panel, and the housing may further include a rear panel having a rear window opposite the front window. The device may further include a rear illumination optical path, a rear detection optical path and a rear supplemental detection optical path. Light emitted by the optical emitter may travel along the rear illumination optical path from the optical emitter to the rear window to exit the housing. Light in the first spectral band entering the housing through the rear window may travel along the rear detection optical path from the rear window to the first detector. The light in the first spectral band entering the housing through the rear window may include light in the first spectral band reflected from at least one object in a further field of view outside the housing. Light in the second spectral band entering the housing through the rear window may travel along the rear supplemental detection optical path from the rear window to the second detector. The light in the second spectral band entering the housing through the rear window may include light in the second spectral band reflected from or emitted by the at least one object in the further field of view. A portion of the rear illumination optical path leading to the rear window coincides with a portion of the rear detection optical path leading from the rear window.

In some embodiments, the device may include signal processing circuitry within the housing and connected to the first detector. The signal processing circuitry may be configured to compute a depth image of the at least one object in the field of view based on the first detection signal.

In some embodiments, the signal processing circuitry may be configured to compute the depth image using a time-of-flight method.

In some embodiments, the device may include a signal processing circuitry within the housing and connected to the first detector and to the second detector. The signal processing circuitry may be configured to compute a depth image of the at least one object in the field of view based on the first detection signal and to compute a color image of the at least one object in the field of view based on the second detection signal.

In some embodiments, the device may include a signal processing circuitry within the housing and connected to the first detector. The signal processing circuitry may be configured to compute a panoramic depth image of the at least one object in the field of view and the at least one object in the further field of view based on the first detection signal.

In some embodiments, the device may include a signal processing circuitry within the housing and connected to the first detector and to the second detector. The signal processing circuitry may be configured to compute a panoramic depth image of the at least one object in the field of view and the at least one object in the further field of view based on the first detection signal and to compute a panoramic color image of the at least one object in the field of view and the at least one object in the further field of view based on the second detection signal.

In some embodiments, a device may include a housing, an optical emitter, a photosensitive first detector within the housing, a photosensitive second detector within the housing, a detection optical path and a supplemental detection optical path. The housing may include a panel having an entrance window through which light may be transmittable into the housing. The optical emitter may emit light in a first spectral band and may be arranged such that light emitted by the optical emitter propagates outside the housing. The first detector may be configured to detect light in the first spectral band and generate a first detection signal in response to the detected light in the first spectral band. The second detector may be configured to detect light in a second spectral band different from the first spectral band and generate a second detection signal in response to the detected light in the second spectral band. Light in the first spectral band entering the housing through the entrance window may travel along the detection optical path from the entrance window to the first detector. The light in the first spectral band entering the housing through the entrance window may include light in the first spectral band reflected from at least one object in a field of view outside the housing. Light in the second spectral band entering the housing through the entrance window may travel along the supplemental detection optical path from the entrance window to the second detector. The light in the second spectral band entering the housing through the entrance window may include light in the second spectral band reflected from or emitted by the least one object in the field of view. A portion of the detection optical path leading from the entrance window coincides with a portion of the supplemental detection optical path leading from the entrance window.

In some embodiments, the optical emitter may be mounted on the panel.

In some embodiments, the optical emitter may be within the housing and the panel may have an exit window through which light may be transmittable out of the housing.

In some embodiments, the device may include a dichroic mirror positioned in the detection optical path and in the supplemental detection optical path. The dichroic mirror may separate the supplemental detection optical path from the detection optical path.

In some embodiments, the dichroic mirror may reflect light along the detection optical path and may transmit light along the supplemental detection optical path.

In some embodiments, the first spectral band may be within the infra-red region of the electromagnetic spectrum and the second spectral band may be within the visible region of the electromagnetic spectrum.

In some embodiments, the device may include a structured light component arranged to structure light emitted by the optical emitter.

In some embodiments, the structured light component may be a diffractive optical element.

In some embodiments, the device may include a signal processing circuitry within the housing and connected to the first detector and to the second detector. The signal processing circuitry may be configured to compute a depth image of the at least one object in the field of view based on the first detection signal and to compute a color image of the at least one object in the field of view based on the second detection signal.

In some embodiments, the signal processing circuitry may be configured to compute the depth image using a time-of-flight method.

In some embodiments, the panel may be a front panel of the housing. The entrance window may be a front entrance window of the front panel. The front panel may further include a front exit window. The optical emitter may be within the housing. The housing may further include a rear panel having a rear entrance window opposite the front entrance window and a rear exit window opposite the front exit window. The device may further include a front illumination optical path, a rear illumination optical path, a rear detection optical path and a rear supplemental detection optical path. Light emitted by the optical emitter may travel along the front illumination optical path from the optical emitter to the front exit window to exit the housing. Light emitted by the optical emitter may travel along the rear illumination optical path from the optical emitter to the rear exit window to exit the housing. Light in the first spectral band entering the housing through the rear entrance window may travel along the rear detection optical path from the rear entrance window to the first detector. The light in the first spectral band entering the housing through the rear entrance window may include light in the first spectral band reflected from at least one object in a further field of view outside the housing. Light in the second spectral band entering the housing through the rear entrance window may travel along the rear supplemental detection optical path from the rear entrance window to the second detector. The light in the second spectral band entering the housing through the rear entrance window may include light in the second spectral band reflected from or emitted by the least one object in the further field of view. A portion of the rear detection optical path leading from the rear entrance window coincides with a portion of the rear supplemental detection optical path leading from the rear entrance window.

Figure 4:
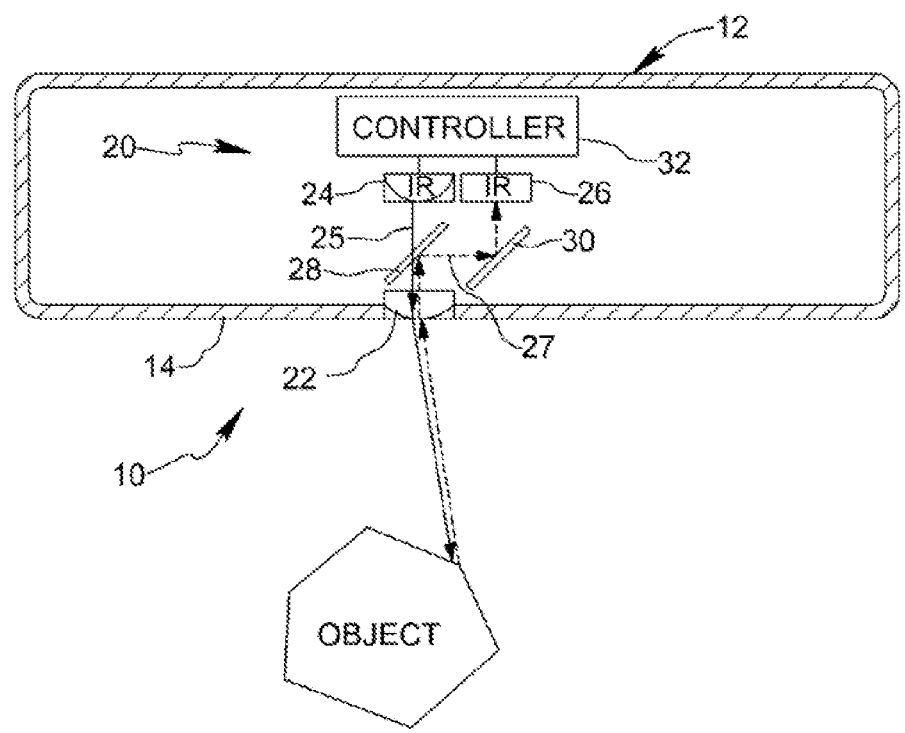
FIG. 4 is a schematic view of a device having a monocular depth camera system formed in accordance with a first embodiment of the present disclosure.

FIG. 4 shows an electronic device 10 formed in accordance with a first embodiment of the present disclosure. Device 10 comprises a housing 12 including a front panel 14 facing a scene to be captured by electronic imaging. Device 10 further comprises a monocular depth camera system generally designated by reference numeral 20. Depth camera system 20 includes a window 22 mounted on front panel 14 through which light is transmittable out of housing 12 and into housing 12. For example, window 22 may be or may comprise a lens through which light passes and is refracted. Window 22 may be embodied as a compound lens such as a fisheye lens or other lens having a relatively wide field of view, or as another type of lens. Depth camera system 20 further includes an optical emitter 24 within housing 12 for emitting light in a first spectral band. For example, optical emitter 24 may be an IR emitter which emits light in a spectral band in the infra-red region of the electromagnetic spectrum either directly or by means of a spectral bandpass filter (not shown). Depth camera system 20 also includes a photosensitive detector 26 within housing 12 for detecting light in the first spectral band and generating a first detection signal in response to the detected light in the first spectral band. For example, detector 26 may be a CMOS or CCD camera having a two-dimensional array of pixels each sensitive to light in the first spectral band. In the embodiment of FIG. 4, detector 26 may be an IR camera sensitive to light emitted by IR emitter 24.

Optical emitter 24 and detector 26 are connected to a controller 32 located within housing 12. Controller 32 provides signal processing circuitry which controls the acquisition and storage of depth images. Controller 32 may include one or more processors and electrical circuits, and one or more memory modules. Controller 32 may be programmed, for example by stored software instructions, to activate optical emitter 24 in response to a user input signal or a signal from an operating system of the device, and to sample and store a detection signal generated by detector 26. Activation of optical emitter 24 and sampling of the detection signal from detector 26 may be controlled in a predetermined timed sequence by controller 32, such that once the emitted light photons exit window 22 the detector 26 is activated to receive incoming reflected photons. Controller 32 may be programmed to carry out image processing operations to compute a depth image based on the acquired detection signal. For example, in the embodiment of FIG. 4, controller 32 may be configured to compute a depth image of at least one object in the field of view of depth camera system 20 by time-of-flight (ToF) methods.

Figure 4A:
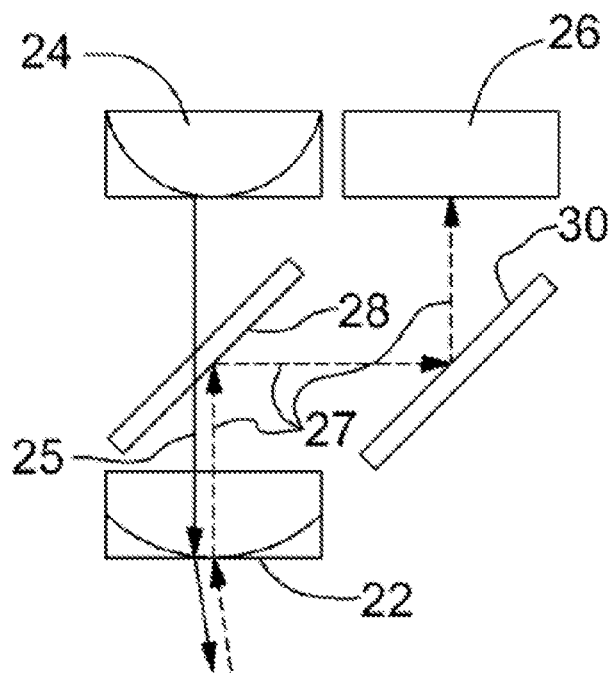
FIG. 4A is an enlarged schematic view of the monocular depth camera system shown in FIG. 4.

Reference is made also to FIG. 4A. Light emitted by optical emitter 24 travels along an illumination optical path 25, indicated by solid line in FIGS. 4 and 4A, from the optical emitter to window 22. The light then exits housing 12 through window 22 to illuminate at least one object in a field of view outside the housing. In the schematic diagram of FIG. 4, only one illuminating ray in an illuminating beam of light is shown, however those skilled in the art will understand that a divergent cone of light exits housing 12 to illuminate object(s) in a field of view outside the housing. As shown in FIG. 4, illuminating light in the first spectral band is reflected by the object back toward window 22. The returning light, indicated by dotted line, passes through window 22 to enter housing 12. The returning light, which is in the first spectral band (e.g. IR light), travels along a detection optical path 27 from window 22 to detector 26.

In the embodiment shown, window 22 is the only outwardly-facing optical component of depth camera system 20, and light travels out of and back into housing 12 through window 22. As best seen in FIG. 4A, a portion of illumination optical path 25 leading to window 22 coincides with a portion of detection optical path 27 leading from window 22. Depth camera system 20 may include a semi-transparent mirror 28 and a mirror 30, both of which are located within housing 12. As shown in FIGS. 4 and 4A, semi-transparent mirror 28 may be positioned in the illumination optical path 25 and in the detection optical path 27. In the illustrated arrangement, semi-transparent mirror 28 transmits light along illumination optical path 25 as the light travels from optical emitter 24 toward window 22, and semi-transparent mirror 28 reflects light along detection optical path 27 as the light travels from window 22 to detector 26. Mirror 30 may be positioned in detection optical path 27 to reflect light toward detector 26 after the light has been reflected by semi-transparent mirror 28. Of course, mirror 30 may be omitted and detector 26 may be arranged to face semi-transparent mirror 28 and directly receive light therefrom.

As may be understood from FIGS. 4 and 4A, device 10 has only one outwardly-facing optical component, namely window 22, on front panel 14. Consequently, the illumination and detection rays have a common direction, thereby reducing shadow regions in the captured image caused by occlusion of the illuminating light beam.

Figure 5:
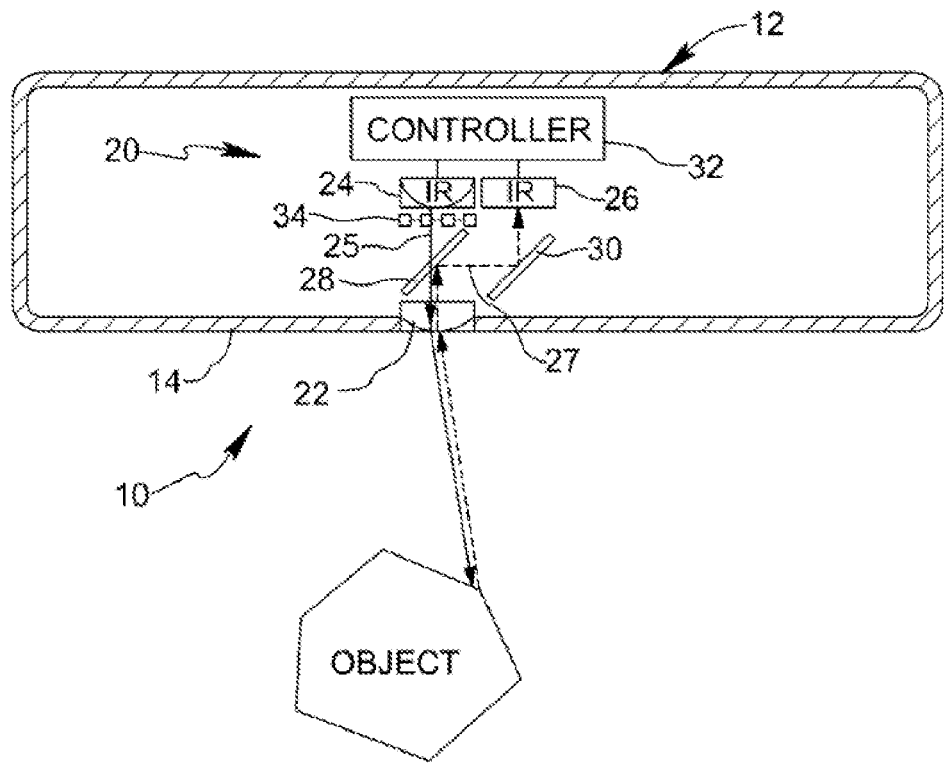
FIG. 5 is a schematic view of a device having a monocular depth camera system formed in accordance with a second embodiment of the present disclosure.

FIG. 5 shows an electronic device 10 formed in accordance with a second embodiment of the present disclosure. Depth camera system 20 is largely similar to that of the first embodiment, except that it includes a structured light component 34 arranged in illumination optical path 25 for structuring the emitted light beam. For example, structured light component 34 may be a diffractive optical element (DOE). In the embodiment of FIG. 5, controller 32 may be configured to compute a depth image of at least one object in the field of view of depth camera system 20 by structured light methodology.

Figure 6:
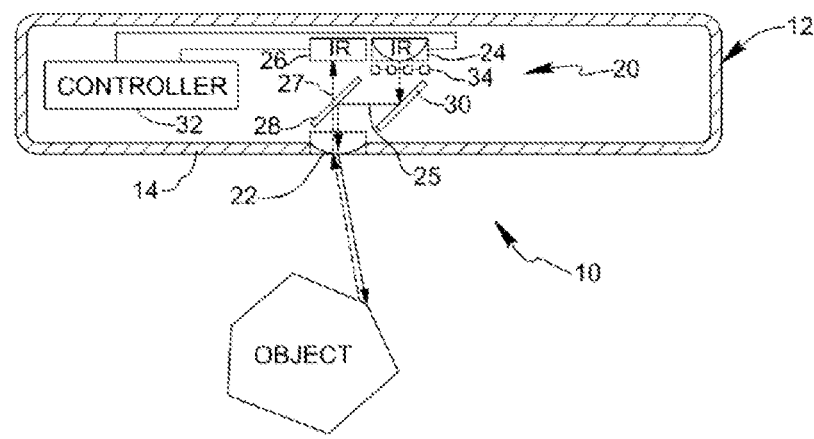
FIG. 6 is a schematic view of a device having a monocular depth camera system formed in accordance with a third embodiment of the present disclosure.

In a third embodiment illustrated in FIG. 6, the positions of optical emitter 24 and detector 26 are swapped with one another. In this embodiment, semi-transparent mirror 28 reflects light along illumination optical path 25 as the light travels from optical emitter 24 toward window 22, and transmits light along detection optical path 27 as the light travels from window 22 to detector 26.

Figure 7:
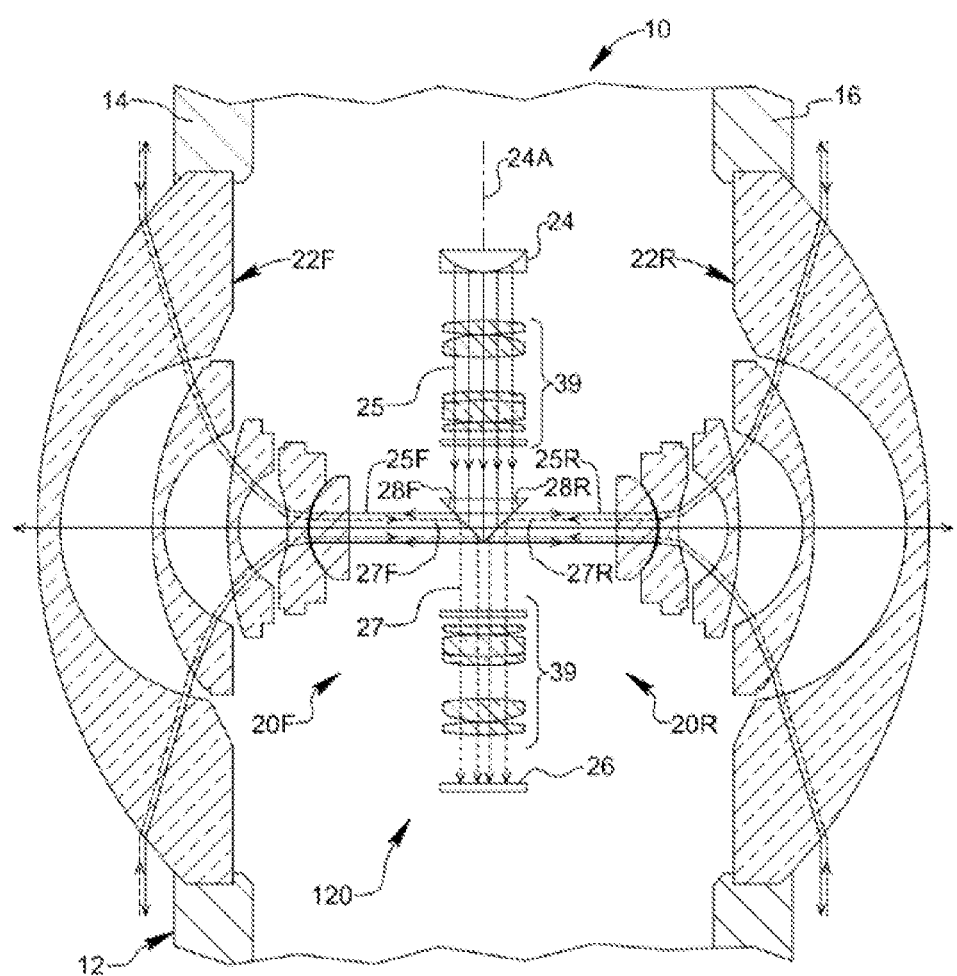
FIG. 7 is a schematic view of a monocular panoramic depth camera system formed in accordance with a fourth embodiment of the present disclosure.

FIG. 7 is a schematic view of a monocular panoramic depth camera system 120 formed in accordance with a fourth embodiment of the present disclosure. As shown in FIG. 7, panoramic depth camera system 120 may be incorporated in a device 10 having a housing 12 which includes a front panel 14 and a rear panel 16 opposite the front panel 14. Panoramic depth camera system 120 comprises a front depth camera system 20F associated with front panel 14, and a rear depth camera system 20R associated with rear panel 16, wherein the front and rear depth camera systems 20F, 20R share a single optical emitter 24 and a single detector 26 located within housing 12. Front depth camera system 20F includes a front window 22F mounted on front panel 14 through which light is transmittable out of and into housing 12, and rear depth camera system 20R includes a rear window 22R mounted on rear panel 16 opposite front window 22F through which light is transmittable out of and into housing 12. Thus, there is exactly one outwardly-facing optical component associated with each panel 14, 16. As shown in FIG. 7, front window 22F and rear window 22R may each be embodied as a compound lens such as a fisheye lens or other lens having a relatively wide field of view useful to obtain wide angle panoramic images.

Light emitted by optical emitter 24 travels along an illumination optical path 25, indicated by solid line in FIG. 7, to a pair of semi-transparent mirrors 28F, 28R arranged in mirror image relationship to one another about a central axis 24A of optical emitter 24. The light beam from optical emitter 24 is divided into two beam portions by semi-transparent mirrors 28F, 28R. A first portion of the beam is reflected by semi-transparent mirror 28R in a forward direction and is transmitted along a front illumination optical path 25F through semi-transparent mirror 28F for passage out of housing 12 through front window 22F. A second portion of the beam is reflected by semi-transparent mirror 28F in a rearward direction and is transmitted through semi-transparent mirror 28R along a rear illumination optical path 25R for passage out of housing 12 through rear window 22R. Light exiting housing 12 through front window 22F illuminates objects in a field of view facing front panel 14, whereas light exiting housing 12 through rear window 22R illuminates objects in a further field of view facing rear panel 16. To the extent the conically divergent illumination beam leaving each window 22F, 22R approaches 180°, depth information may be captured for a panoramic field of view approaching 360° around device 10.

Illuminating light in the first spectral band emitted by optical emitter 24 is reflected by objects facing front and rear panels 14, 16 back toward windows 22F, 22R, respectively. The returning light, indicated by dotted line, passes through windows 22F, 22R to enter housing 12. The returning light, which is in the first spectral band (e.g. IR light), travels along a detection optical path 27 from windows 22F, 22R to detector 26. Light entering housing 12 through front window 22F along a front detection optical path 27F is reflected by semi-transparent mirror 28F toward detector 26. Similarly, light entering housing 12 through rear window 22R along a rear detection optical path 27R is reflected by semi-transparent mirror 28R toward detector 26. As may be understood from FIG. 7, semi-transparent mirror 28R is positioned in the front illumination optical path 25F and in the rear detection optical path 27R, and semi-transparent mirror 28F is positioned in the rear illumination optical path 25R and in the front detection optical path 27F. Beam conditioning optics 39 may be located in illumination optical path 25 and/or detection optical path 27.

While not shown in FIG. 7, optical emitter 24 and detector 26 are connected to a controller 32 within housing 12 as described above with respect to previous embodiments. In the present embodiment, the controller may provide signal processing circuitry configured to compute a panoramic depth image of objects in the field of view of front window 22F and in the further field of view of rear window 22R based on a detection signal generated by detector 26. For example, controller 32 may be programmed to compute front and rear depth images using time-of-flight methodology, and to assemble a single panoramic depth image from the front and rear depth images by known image processing methodology.

Attention is now directed to FIGS. 8-11 for description of various monocular RGB-D camera systems.

Figure 8:
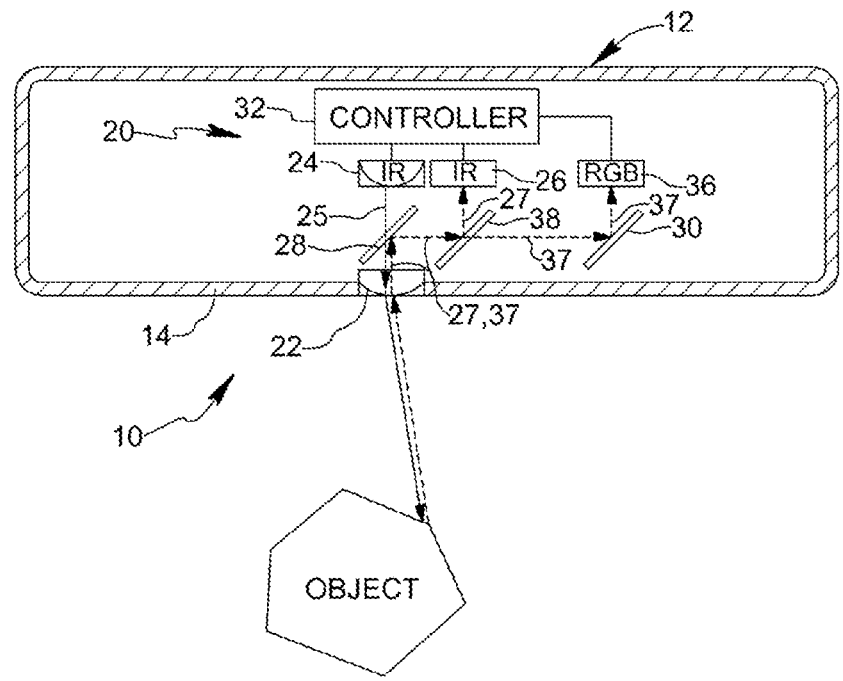
FIG. 8 is a schematic view of a monocular RGB-D camera system formed in accordance with a fifth embodiment of the present disclosure.

FIG. 8 shows an electronic device 10 formed in accordance with a fifth embodiment of the present disclosure. Device 10 is similar to previously described embodiments, but the depth camera system 20 further comprises a photosensitive second detector 36 within housing 12 for detecting light in a second spectral band (e.g. visible light) different from the first spectral band (e.g. IR light) sensed by detector 26, and generating a second detection signal in response to the detected light in the second spectral band. For example, second detector 36 may be a CMOS or CCD color camera having a two-dimensional array of pixels each sensitive to light in the second spectral band. A three-chip color CCD is suitable as second detector 36. A single chip CCD in combination with a mosaic (e.g. Bayer) optical filter to separate incoming light into a series of colors (e.g. red, green, and blue) is also suitable as second detector 36.

Depth camera system 20 in FIG. 8 includes a supplemental detection optical path 37 along which light in the second spectral band entering housing 12 through window 22 travels from the window to second detector 36. As will be understood, light in the second spectral band entering housing 12 through window 22 comprises light reflected from or emitted by at least one object in the field of view or window 22. A dichroic mirror 38 may be positioned in detection optical path 27 and in supplemental detection optical path 37 to separate the supplemental detection optical path from the detection optical path. For example, dichroic mirror 38 may be chosen to reflect light in the first spectral band (e.g. IR light) along detection optical path 27 leading to first detector 26, and to transmit light in the second spectral band (e.g. visible light) along supplemental detection optical path 37 leading to second detector 36. A suitable dichroic mirror 38 may be a shortpass dichroic mirror which transmits about 90% of visible light in the 400 nm-788 nm wavelength spectral band, and reflects about 95% of IR light in the 823 nm-1300 nm wavelength spectral band.

In the embodiment of FIG. 8, controller 32 may be connected to optical emitter 24, first detector 26, and second detector 36. Controller 32 may include signal processing circuitry configured to compute a depth image of at least one object in the field of view based on the first detection signal generated by first detector 26 and to compute a color image of the at least one object in the field of view based on the second detection signal generated by second detector 36. For example, controller 32 may be programmed to perform image processing steps to compute a single RGB-D image having both depth and color information from a depth image based on the first detection signal and a color image based on the second detection signal.

A consideration in the depth camera system 20 of FIG. 8 is the loss of optical energy at semi-transparent mirror 28 and dichroic mirror 38. IR light from optical emitter 24 passes through semi-transparent mirror 28 on its way out of housing 12, is reflected by semi-transparent mirror 28 after returning to housing 12, and is reflected by dichroic mirror 38 toward detector 26. At each of these three interfaces, optical energy is lost. If semi-transparent mirror 28 is chosen to have a transmission efficiency of 0.1 (i.e. 10% of incoming light is transmitted and 90% of incoming light is reflected), and dichroic mirror 38 has the transmission and reflection properties described above, then a beam emitted by optical emitter 24 will contain about $\frac{1}{12}$ of its original energy (~0.95×0.9×0.1) by the time it arrives at first detector 26. Consequently, to maintain a given image quality of the depth image compared to a prior art system, the energy consumption of optical emitter 24 needs to be increased by about twelve times. Also, only about 80% of visible light entering housing 12 through window 22 will reach second detector 36. The sixth embodiment shown in FIG. 9 addresses this consideration and improves energy consumption by rearranging the optical components of depth camera system 20 and using a semi-transparent mirror 28 having a more balanced transmission efficiency of 0.5 (i.e. 50% of incoming light is transmitted and 50% of incoming light is reflected).

Figure 9:
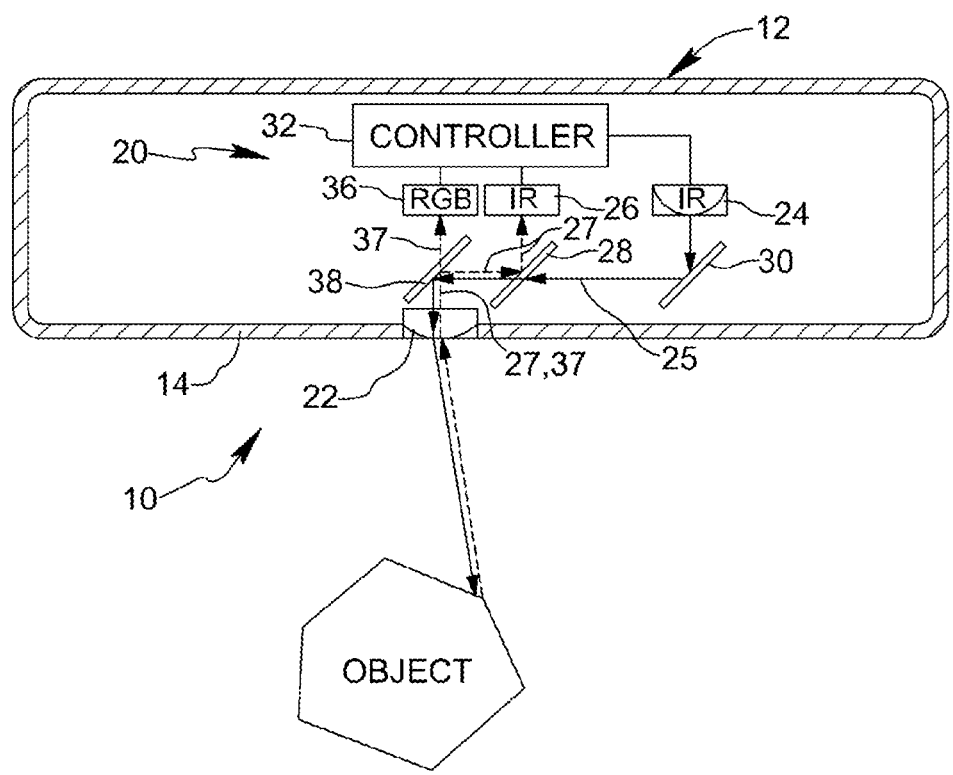
FIG. 9 is a schematic view of a monocular RGB-D camera system formed in accordance with a sixth embodiment of the present disclosure.

In the sixth embodiment shown in FIG. 9, the locations of optical emitter 24 and second detector 26 are swapped, as are the locations of semi-transparent mirror 28 and dichroic mirror 38. The illumination optical path 25 is reflected at mirror 30, passes through semi-transparent mirror 28, and is reflected again at dichroic mirror 38. The detection optical path 27 is reflected at dichroic mirror 38 and reflected again at semi-transparent mirror 28 on its way to first detector 26. Thus, the IR beam from optical emitter 24 will carry about $\frac{2}{9}$ of its original energy (~0.5×0.95×0.95×0.5) by the time it arrives at first detector 26. About 90% of visible light entering housing 12 through window 22 will reach second detector 36. As a result, energy consumption is decreased and color image quality is improved in the sixth embodiment of FIG. 9 as compared to the fifth embodiment of FIG. 8.

Figure 10:
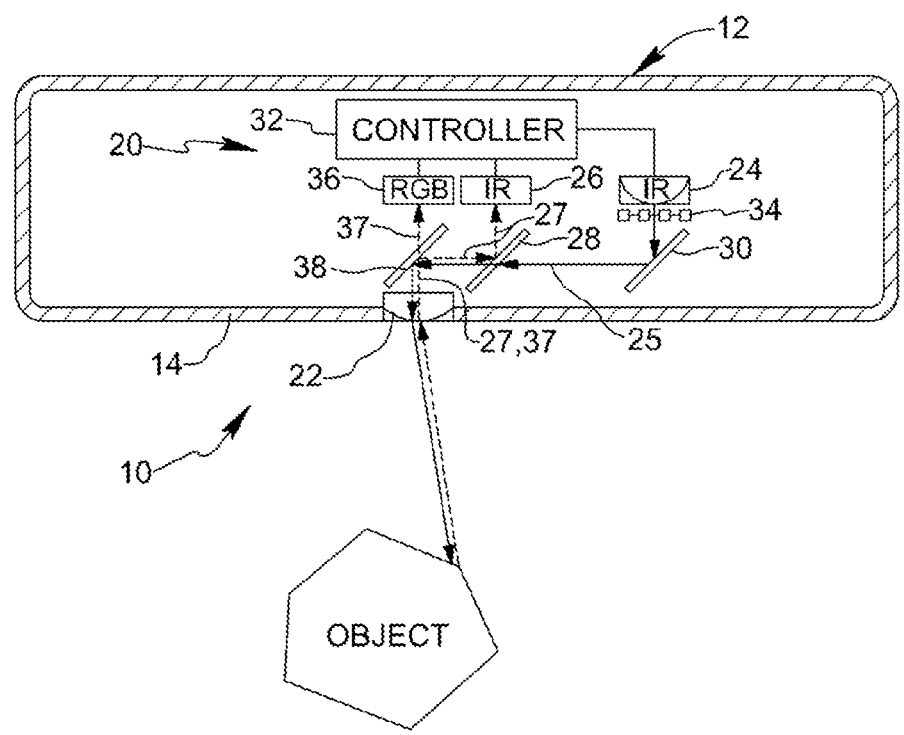
FIG. 10 is a schematic view of a monocular RGB-D camera system formed in accordance with a seventh embodiment of the present disclosure.

FIG. 10 shows an electronic device 10 formed in accordance with a seventh embodiment of the present disclosure. Depth camera system 20 is largely similar to that of the sixth embodiment, except that it includes a structured light component 34 arranged in illumination optical path 25 for structuring the emitted light beam. For example, structured light component 34 may be a diffractive optical element (DOE). In the embodiment of FIG. 10, controller 32 may be configured to compute depth information for the RGB-D image by structured light methodology.

Figure 11:
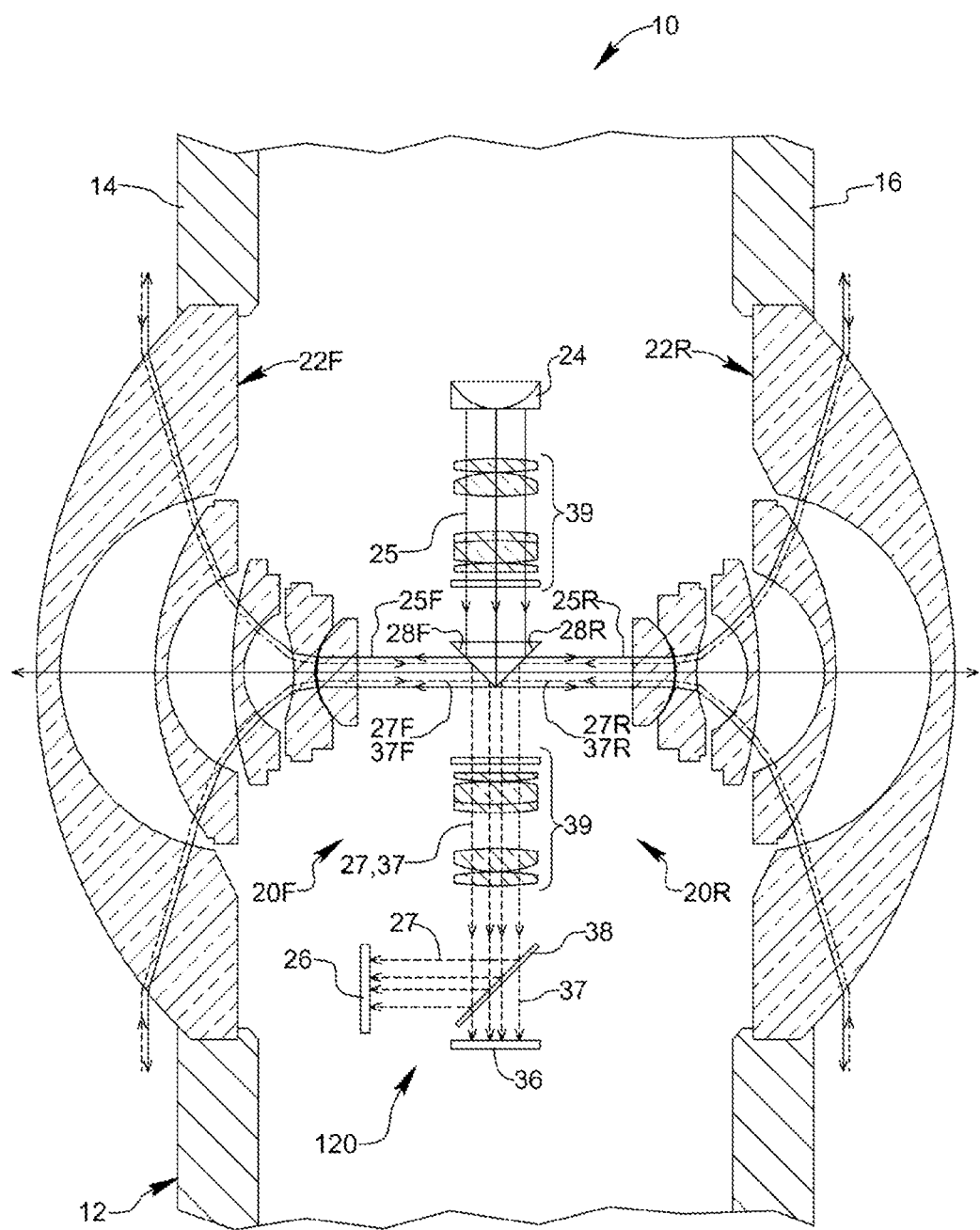
FIG. 11 is a schematic view of a monocular panoramic RGB-D camera system formed in accordance with an eighth embodiment of the present disclosure.

FIG. 11 illustrates a device 10 according to an eighth embodiment having a monocular panoramic RGB-D camera system 120 that is analogous to the monocular panoramic depth camera system shown in FIG. 7. As may be seen, light traveling along detection optical path 27 is split by a dichroic mirror 38. Light in a first spectral band (e.g. IR light) is reflected by dichroic mirror 38 toward a first detector 26 sensitive to light in the first spectral band. Light in a second spectral band (e.g. visible light) is transmitted by dichroic mirror 38 along a supplemental detection optical path 37 toward a second detector 36 sensitive to light in the second spectral band.

While not shown in FIG. 11, optical emitter 24, first detector 26, and second detector 36 are connected to a controller 32 within housing 12 as described above with respect to previous embodiments. In the embodiment shown in FIG. 11, the controller may provide signal processing circuitry configured to compute a panoramic RGB-D image of objects in the field of view of front window 22F and in the further field of view of rear window 22R based on a first detection signal generated by first detector 26 and a second detection signal generated by second detector 36. For example, the controller may be programmed to perform image processing steps to compute a single panoramic RGB-D image of objects facing front panel 14 and objects facing rear panel 16, wherein the RGB-D image includes both depth and color information ascertained from the first detection signal and the second detection signal, respectively.

Figure 2:
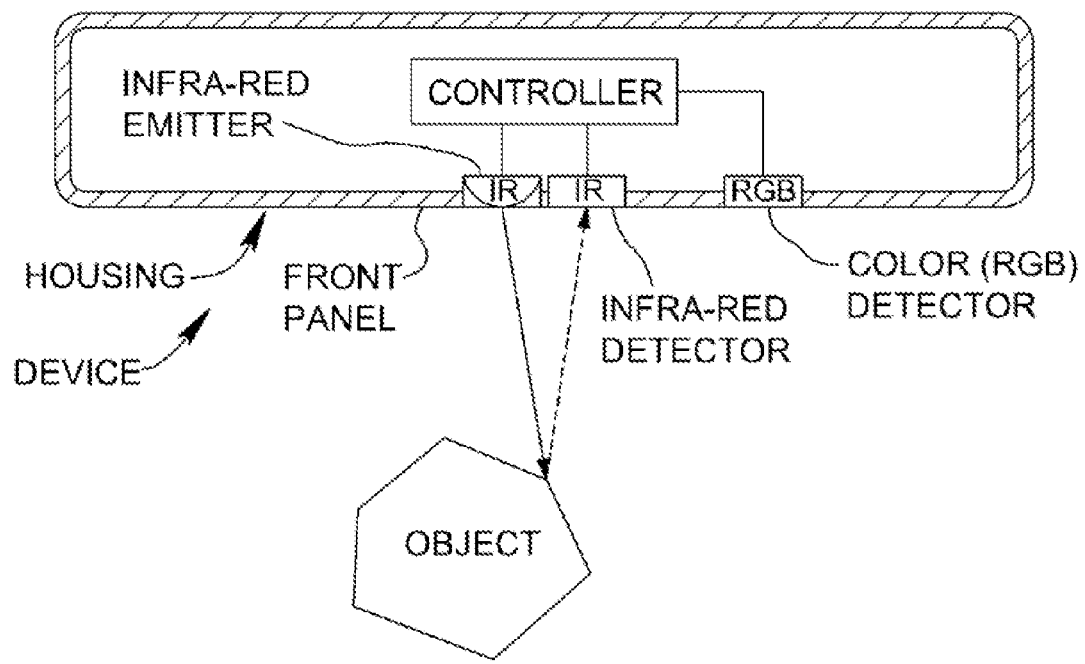
FIG. 2 is a schematic view of a device having a known RGB-D camera system of the prior art.
Figure 3:
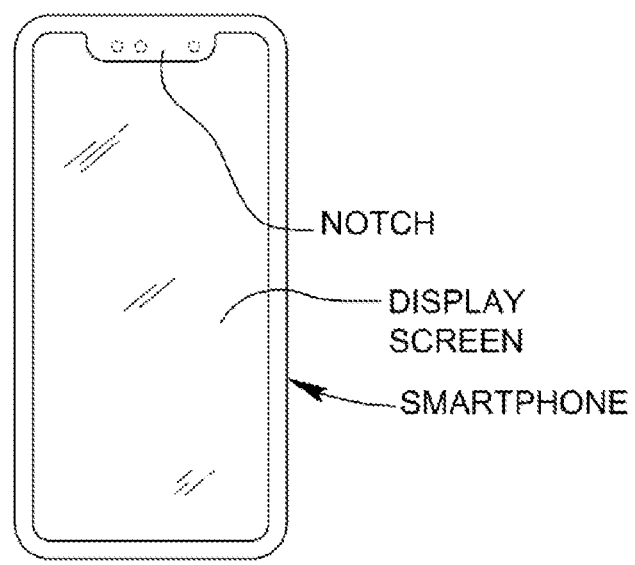
FIG. 3 is a plan view showing a known arrangement of smartphone front panel and display screen, wherein the front panel includes a notch.

The RGB-D camera system embodiments illustrated in FIGS. 8-11 provide an advantage over the prior art RGB-D camera system illustrated in FIG. 2. In the prior art system of FIG. 2, extra image processing steps are required to properly align the depth images to the color images because the depth images and the color images are acquired from different viewpoints. By contrast, in the embodiments illustrated in FIGS. 8-11, the depth images and color images are acquired from the same monocular viewpoint of window 22, so that extra image processing steps for alignment of depth and color images are unnecessary.

Figure 12:
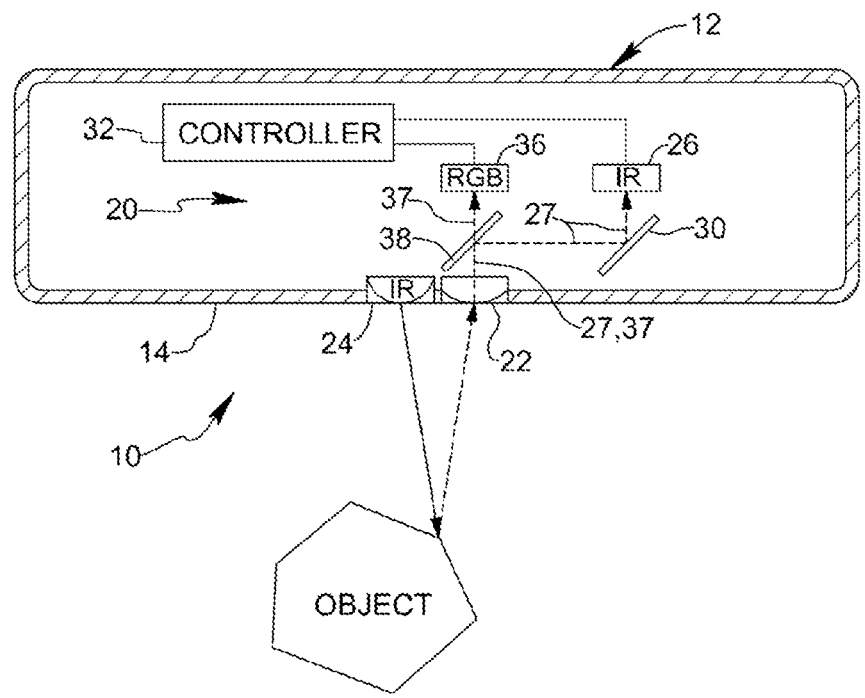
FIG. 12 is a schematic view of a binocular RGB-D camera system formed in accordance with a ninth embodiment of the present disclosure.
Figure 13:
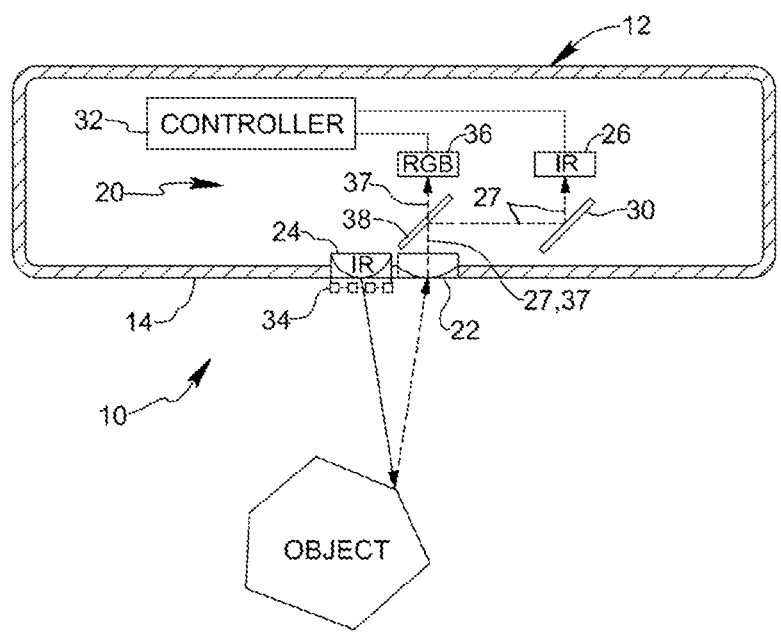
FIG. 13 is a schematic view of a binocular RGB-D camera system formed in accordance with a tenth embodiment of the present disclosure.
Figure 14:
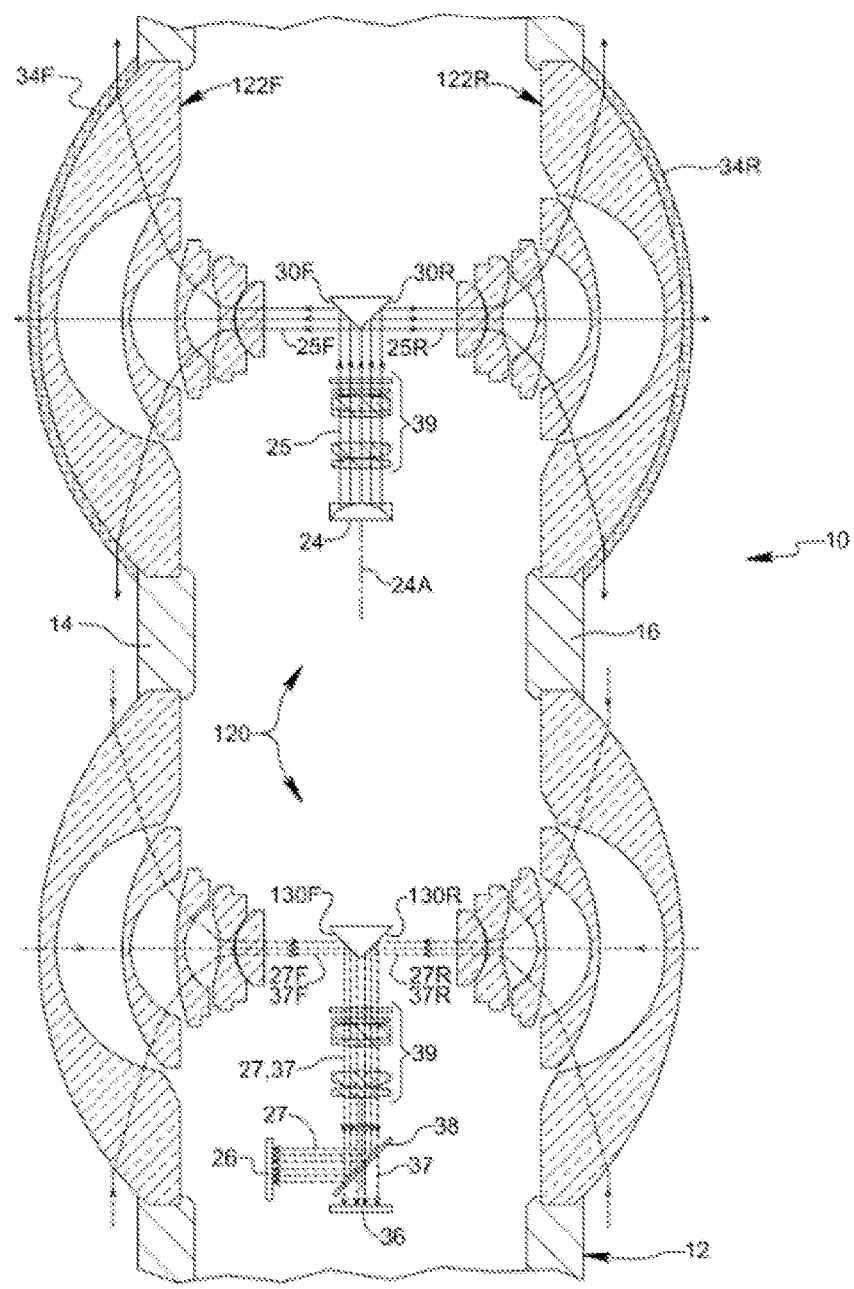
FIG. 14 is a schematic view of a binocular panoramic RGB-D camera system formed in accordance with an eleventh embodiment of the present disclosure.

Reference is now made to FIGS. 12-14 for description of various binocular RGB-D camera systems. The binocular RGB-D systems in FIGS. 12-14 each have exactly two outwardly-facing optical components, one related to exit of light for depth imaging, and the other related to collection of light for depth and color imaging.

In a ninth embodiment shown in FIG. 12, an optical emitter 24 is mounted on front panel 14 to face outwardly onto a scene, and an entrance window 22 is dedicated to light entry into housing 12. Optical emitter 24 emits light in a first spectral band (e.g. IR light) which propagates outside housing 12. Light in the first spectral band reflected by objects in the field of view of entrance window 22 enters the housing through the entrance window. Light in a second spectral band (e.g. visible light) that is reflected from or emitted by objects in the field of view of entrance window 22 also enter housing 12 through the entrance window.

Like the monocular RGB-D camera systems described above, depth camera system 20 in FIG. 12 includes a photosensitive first detector 26 within the housing for detecting light in the first spectral band and generating a first detection signal in response thereto, and a photosensitive second detector 36 within the housing for detecting light in the second spectral band and generating a second detection signal in response thereto. Device 10 in FIG. 12 includes a detection optical path 27 along which light in the first spectral band travels from entrance window 22 to first detector 26, and a supplemental detection optical path 37 along which light in the second spectral band travels from entrance window 22 to second detector 36. A portion of the detection optical path 27 leading from the entrance window 22 coincides with a portion of the supplemental detection optical path 37 leading from the entrance window. A dichroic mirror 38 may be positioned in detection optical path 27 and in supplemental detection optical path 37, wherein the dichroic mirror separates the supplemental detection optical path 37 from the detection optical path 27. As may be seen, dichroic mirror 38 reflects light in the first spectral band along detection optical path 27 and transmits light along supplemental detection optical path 37.

In the embodiment of FIG. 12, controller 32 may be connected to optical emitter 24, first detector 26, and second detector 36. Controller 32 may include signal processing circuitry configured to compute a depth image of at least one object in the field of view based on the first detection signal generated by first detector 26 and to compute a color image of the at least one object in the field of view based on the second detection signal generated by second detector 36. For example, controller 32 may be programmed to perform image processing steps to compute a single RGB-D image having both depth and color information from a depth image based on the first detection signal and a color image based on the second detection signal.

FIG. 13 shows an electronic device 10 formed in accordance with a tenth embodiment of the present disclosure. Depth camera system 20 is largely similar to that of the ninth embodiment, except that it includes a structured light component 34 arranged to structure light emitted by optical emitter 24. For example, structured light component 34 may be a diffractive optical element (DOE) attached to front panel 14 and/or to an exit end of optical emitter 24. In the embodiment of FIG. 10, controller 32 may be configured to compute depth information for the RGB-D image by structured light methodology.

FIG. 14 illustrates a device 10 according to an eleventh embodiment having a binocular panoramic RGB-D camera system 120 that is analogous to the monocular panoramic RGB-D camera system shown in FIG. 11, however it further includes a front exit window 122F and a rear exit window 122R as outwardly-facing optical components on front panel 14 and rear panel 16, respectively.

Light in a first spectral band (e.g. IR light) emitted by optical emitter 24 travels along an illumination optical path 25, indicated by solid line in FIG. 14, to a pair of mirrors 30F, 30R arranged in mirror image relationship to one another about a central axis 24A of optical emitter 24. The light beam from optical emitter 24 is divided into two beam portions by mirrors 30F, 30R. A first portion of the beam is reflected by mirror 30F in a forward direction and is transmitted along a front illumination optical path 25F for passage out of housing 12 through front exit window 122F. A second portion of the beam is reflected by mirror 30R in a rearward direction and is transmitted along a rear illumination optical path 25R for passage out of housing 12 through rear exit window 122R. Structured light components 34F, 34R, for example diffractive optical elements, may be provided on an exit surface of front and rear exit windows 122F, 122R. Light exiting housing 12 through front exit window 122F illuminates objects in a field of view facing front panel 14, whereas light exiting housing 12 through rear exit window 122R illuminates objects in a further field of view facing rear panel 16. To the extent the conically divergent illumination beam leaving each exit window 122F, 122R approaches 180°, depth information may be captured for a panoramic field of view approaching 360° around device 10.

Light reflected from and emitted by objects facing front panel 14, including light in the first spectral band originating at optical emitter 24 and light in the second spectral band (e.g. visible light), enters housing 12 through front entrance window 22F. Likewise, light reflected from and emitted by objects facing rear panel 16, including light in the first spectral band originating at optical emitter 24 and light in the second spectral band (e.g. visible light), enters housing 12 through rear entrance window 22R.

Light entering housing 12 through front entrance window 22F travels along a front detection optical path 27F to reach first detector 26 and along a front supplemental detection optical path 37F to reach second detector 36. Likewise, light entering housing 12 through rear entrance window 22R travels along a rear detection optical path 27R to reach first detector 26 and along a rear supplemental detection optical path 37R to reach second detector 36. Front detection optical path 27F and front supplemental detection optical path 37F coincide with one another from front entrance window 22F until the detection optical paths 27F, 37F reach dichroic mirror 38. Rear detection optical path 27R and rear supplemental detection optical path 37R coincide with one another from rear entrance window 22R until the detection optical paths 27R, 37R reach dichroic mirror 38. A pair of mirrors 130F, 130R may be arranged to reflect the incoming light toward dichroic mirror 38. At dichroic mirror 38, light in the first spectral band is reflected along detection optical path 27 to first detector 26, whereas light in the second spectral band is transmitted along supplemental detection optical path 37 to second detector 36.

Optical emitter 24, first detector 26, and second detector 36 are connected to a controller 32 within housing 12 as described above with respect to previous embodiments. The controller may provide signal processing circuitry configured to compute a panoramic RGB-D image of objects in the field of view of front window 22F and in the further field of view of rear window 22R based on a first detection signal generated by first detector 26 and a second detection signal generated by second detector 36. For example, the controller may be programmed to perform image processing steps to compute a single panoramic RGB-D image of objects facing front panel 14 and objects facing rear panel 16, wherein the RGB-D image includes both depth and color information ascertained from the first detection signal and the second detection signal, respectively. Where structured light components 34R, 34F are provided, the controller may be programmed to calculate depth information by structured light methodology.

In the binocular embodiments of FIGS. 12-14, light from optical emitter 24 used for depth measurement does not encounter a semi-transparent mirror or a dichroic mirror during its round-trip journey from optical emitter 24 to the object and from the object to the first detector 26. Consequently, energy loss is negligible and energy consumption by optical emitter 24 is minimized.

As may be appreciated from the foregoing description, the present disclosure addresses the abovementioned drawbacks of known depth camera systems and RGB-D camera systems. The monocular embodiments eliminate unwanted shadows. The monocular RGB-D camera systems disclosed herein eliminate extra processing steps required to properly align the depth images to the RGB images. All embodiments simplify manufacturing and facilitate making a waterproof device by reducing the number of outwardly-facing optical components on a housing panel of the device. In smartphones that have a notch, the size of the notch can be kept small for improved aesthetic appearance and greater screen-to-body ratio.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the claims.

What is claimed is:

1. A depth camera device, comprising:
   a housing including a front panel having a front window through which light is transmittable out of and into the housing and a rear panel having a rear window opposite the front window;
   an optical emitter within the housing, wherein the optical emitter emits light in a first spectral band;
   a photosensitive first detector within the housing, wherein the first detector is configured to detect light in the first spectral band and generate a first detection signal in response to the detected light in the first spectral band;
   a front illumination optical path along which light emitted by the optical emitter travels from the optical emitter to the front window to exit the housing;
   a front detection optical path along which light in the first spectral band entering the housing through the front window travels from the front window to the first detector, wherein the light in the first spectral band entering the housing through the front window comprises light in the first spectral band reflected from at least one object in a field of view outside the housing;
   a rear illumination optical path along which light emitted by the optical emitter travels from the optical emitter to the rear window to exit the housing; and
   a rear detection optical path along which light in the first spectral band entering the housing through the rear window travels from the rear window to the first detector, wherein the light in the first spectral band entering the housing through the rear window comprises light in the first spectral band reflected from at least one object in a further field of view outside the housing,
   wherein a portion of the front illumination optical path leading to the front window coincides with a portion of the front detection optical path leading from the front window, and
   wherein a portion of the rear illumination optical path leading to the rear window coincides with a portion of the rear detection optical path leading from the rear window.

2. The depth camera device as claimed in claim 1, further comprising a semi-transparent mirror within the housing, wherein the semi-transparent mirror is positioned in the front illumination optical path and the front detection optical path.

3. The depth camera device as claimed in claim 2, wherein the semi-transparent mirror transmits light along the front illumination optical path and reflects light along the front detection optical path, or the semi-transparent mirror reflects light along the front illumination optical path and transmits light along the front detection optical path.

4. The depth camera device as claimed in claim 3, further comprising a mirror, wherein the mirror is positioned in one of the front detection optical path and the front illumination optical path along which the semi-transparent mirror reflects light.

5. The depth camera device as claimed in claim 1, further comprising a first semi-transparent mirror and a second semi-transparent mirror, the first and second semi-transparent mirrors being located within the housing, wherein the first semi-transparent mirror is positioned in the front illumination optical path and the rear detection optical path, and the second semi-transparent mirror is positioned in the rear illumination optical path and the front detection optical path.

6. The depth camera device as claimed in claim 1, further comprising a signal processing circuitry within the housing and connected to the first detector, wherein the signal processing circuitry is configured to compute a panoramic depth image of the at least one object in the field of view and the at least one object in the further field of view based on the first detection signal.

7. A depth camera device, comprising:
a housing including a front panel having a front window through which light is transmittable out of and into the housing and a rear panel having a rear window opposite the front window;
an optical emitter within the housing, wherein the optical emitter emits light in a first spectral band;
a photosensitive first detector within the housing, wherein the first detector is configured to detect light in the first spectral band and generate a first detection signal in response to the detected light in the first spectral band;
a photosensitive second detector within the housing, wherein the second detector is configured to detect light in a second spectral band different from the first spectral band and generate a second detection signal in response to the detected light in the second spectral band;
a front illumination optical path along which light emitted by the optical emitter travels from the optical emitter to the front window to exit the housing;
a front detection optical path along which light in the first spectral band entering the housing through the front window travels from the front window to the first detector, wherein the light in the first spectral band entering the housing through the front window comprises light in the first spectral band reflected from at least one object in a field of view outside the housing;
a front supplemental detection optical path along which light in the second spectral band entering the housing through the front window travels from the front window to the second detector;
a rear illumination optical path along which light emitted by the optical emitter travels from the optical emitter to the rear window to exit the housing; and
a rear detection optical path along which light in the first spectral band entering the housing through the rear window travels from the rear window to the first detector, wherein the light in the first spectral band entering the housing through the rear window comprises light in the first spectral band reflected from at least one object in a further field of view outside the housing; and
a rear supplemental detection optical path along Ih light In the second spectral band entering the housing through the rear window travels from the rear window to the second detector, wherein the light in the second spectral band entering the housing through the rear window comprises light in the second spectral band reflected from or emitted by the at least one object in the further field of view,
wherein a portion of the front illumination optical path leading to the front window coincides with a portion of the front detection optical path leading from the front window,
wherein a portion of the rear illumination optical path leading to the rear window coincides with a portion of the rear detection optical path leading from the rear window, and
wherein the light in the second spectral band entering the housing through the front window comprises light in the second spectral band reflected from or emitted by the at least one object in the field of view.

8. The depth camera device as claimed in claim 7, further comprising a dichroic mirror positioned in the front detection optical path and the front supplemental detection optical path, wherein the dichroic mirror separates the front supplemental detection optical path from the front detection optical path.

9. The depth camera device as claimed in claim 8, wherein the dichroic mirror reflects light along the front detection optical path and transmits light along the front supplemental detection optical path.

10. The depth camera device as claimed in claim 7, further comprising signal processing circuitry within the housing and connected to the first detector and to the second detector, wherein the signal processing circuitry is configured to compute a panoramic depth image of the at least one object in the field of view and the at least one object in the further field of view based on the first detection signal and to compute a panoramic color image of the at least one object in the field of view and the at least one object in the further field of view based on the second detection signal.

11. A depth camera device comprising:
a housing including a front panel having a front entrance window through which light is transmittable into the housing and a front exit window and a rear panel having a rear entrance window opposite the front entrance window and a rear exit window opposite the front exit window;
an optical emitter within the housing, wherein the optical emitter emits light in a first spectral band and is arranged such that light emitted by the optical emitter propagates outside the housing;
a photosensitive first detector within the housing, wherein the first detector is configured to detect light in the first spectral band and generate a first detection signal in response to the detected light in the first spectral band;
a photosensitive second detector within the housing, wherein the second detector is configured to detect light in a second spectral band different from the first spectral band and generate a second detection signal in response to the detected light in the second spectral band;
a front detection optical path along which light in the first spectral band entering the housing through the front entrance window travels from the front entrance window to the first detector, wherein the light in the first spectral band entering the housing through the front entrance window comprises light in the first spectral band reflected from at least one object in a field of view outside the housing;
a front supplemental detection optical path along which light in the second spectral band entering the housing through the front entrance window travels from the front entrance window to the second detector, wherein the light in the second spectral band entering the housing through the front entrance window comprises light in the second spectral band reflected from or emitted by the least one object in the field of view;
a front illumination optical path along which light emitted by the optical emitter travels from the optical emitter to the front exit window to exit the housing;
a rear illumination optical path along which light emitted by the optical emitter travels from the optical emitter to the rear exit window to exit the housing;
a rear detection optical path along which light in the first spectral band entering the housing through the rear entrance window travels from the rear entrance window to the first detector, wherein the light in the first spectral band entering the housing through the rear entrance window comprises light in the first spectral band reflected from at least one object in a further field of view outside the housing; and a rear supplemental detection optical path along which light in the second spectral band entering the housing through the rear entrance window travels from the rear entrance window to the second detector, wherein the light in the second spectral band entering the housing through the rear entrance window comprises light in the second spectral band reflected from or emitted by the least one object in the further field of view, wherein a portion of the front detection optical path leading from the front entrance window coincides with a portion of the front supplemental detection optical path leading from the front entrance window, and wherein a portion of the rear detection optical path leading from the rear entrance window coincides with a portion of the rear supplemental detection optical path leading from the rear entrance window.

12. The depth camera device as claimed in claim 11, further comprising a dichroic mirror positioned in the front detection optical path and the front supplemental detection optical path, wherein the dichroic mirror separates the front supplemental detection optical path from the front detection optical path.

13. The depth camera device as claimed in claim 12, wherein the dichroic mirror reflects light along the front detection optical path and transmits light along the front supplemental detection optical path.

14. The depth camera device as claimed in claim 11, further comprising a signal processing circuitry within the housing and connected to the first detector and to the second detector, wherein the signal processing circuitry is configured to compute a depth image of the at least one object in the field of view based on the first detection signal and to compute a color image of the at least one object in the field of view based on the second detection signal.

* * * * *